Oct. 1, 1940. E. A. PAILLARD 2,216,478
CINEMATOGRAPHIC PROJECTOR
Filed June 1, 1938
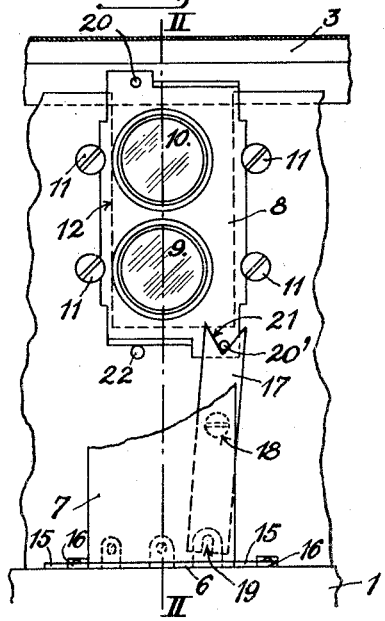
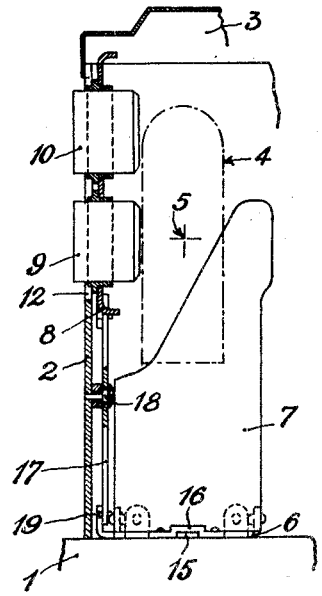
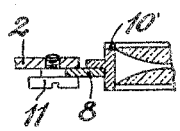
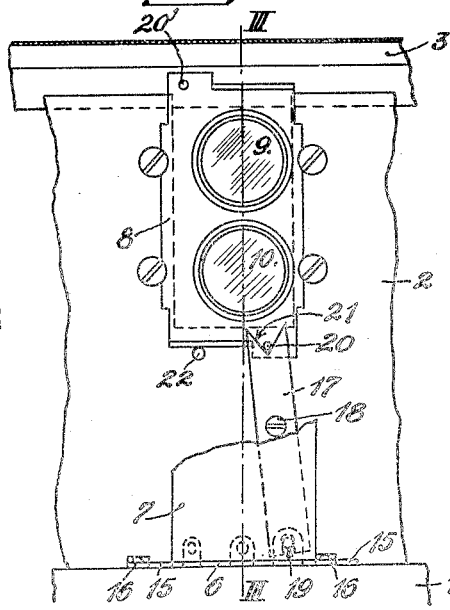
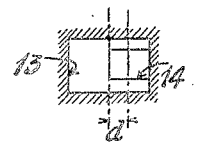
INVENTOR:
ERNEST ALFRED PAILLARD
BY Haseltine, Lake & Co. ATTORNEYS Patented Oct. 1, 1940

2,216,478

UNITED STATES PATENT OFFICE 2,216,478

CINEMATOGRAPHIC PROJECTOR

Ernest Alfred Paillard, Sainte-Croix, Switzerland

Application June 1, 1938, Serial No. 211,112
In Switzerland June 3, 1937

3 Claims. (Cl. 88—24)

This invention relates to a cinematographic projector of the type enabling the consecutive projection of films of different sizes, as for instance films of 16 mm. and films of 8 mm., by providing for each size of film a condenser of determined focal distance, whose axis is brought to pass substantially through the centre of the projection-gate.

In such apparatuses, it is indeed advantageous to be able to modify the focal length of the condenser, so as to utilize in each case, that is to say for each size of projection-gate the totality of the light of the lamp by concentrating it in a conical beam of light whose apex is situated in good position in the projection-objective used which is generally not the same for all sizes.

In the projectors of the type considered in which one single condenser is used, the latter is obviously provided to cover the largest sized gate and, when a smaller size is projected, the gate is only lighted up by part of the luminous beam whose non-utilized part lights up uselessly the corresponding surface of the wall of the members constituting the film channel.

The projector with several condensers according to the invention is characterized in that said condensers are disposed on a condenser carrying member capable of moving in the box of the apparatus, so as to be able to bring the required condenser into centered position before the projection-gate of the corresponding chosen size.

The accompanying drawing shows an embodiment of the invention, given by way of example.

Fig. 1 is a view seen from behind of that part of the projector comprising the condensers.

Fig. 2 is an axial vertical section along II—II of Fig. 1.

Fig. 3 is a view similar to the view of Fig. 1, the condenser-carrying member occupying a position different to that it occupies in Fig. 1.

Figs. 4 and 5 are views of details.

In Figs. 1 and 2, the base of the projector is designated by the numeral 1, while 2 represents part of the wall of the box which contains the source of light and which is closed by a cover designated by the numeral 3.

The position of the light supply is shown in Fig. 2 in dot and dash line and has the form of a bulb 4 whose light supply would be at 5. This bulb is supported by a lamp-holder not shown, integral with a base 6 supporting a protective shade of metallic sheet iron 7.

On a plate 8 are fixed two condensers 9, 10 of different focal distance, one being used for the projection of the film of 16 mm. and the other for the projection of the film of 8 mm. This plate is guided vertically between parallel guides here constituted by the screws 11 maintaining said plate in the manner shown in detail in Fig. 4, which shows a section of same supposed to pass through a horizontal diameter of the condenser 10. It is clear that any other parallel guiding means could be used, for example a slide.

To permit the passage of the condensers when the plate 8 is inserted or extracted from above, after having removed the cover 3, the wall 2 has an opening 12.

As will be seen the condensers in Fig. 1 on the axis II—II are not in the middle of the plate 8 with respect to the width of the latter, so that by turning this plate 180° in its plane after having extracted it from above and by inserting it again in this new position, the condensers 9 and 10 will no longer be on the same vertical axis as before, but on a new axis III—III, as shown in Fig. 3, this axis being in the present case displaced to the right with regard to its position in Fig. 1.

This displacement will have to correspond to the distance d between the axis of the image of 16 mm. and the image of 8 mm., whose frames are represented by the rectangle 13 and the rectangle 14 respectively of Fig. 5. It has been definitely ascertained that by this turning over of the plate, the condenser in use, which was the condenser 9 situated opposite the source 5 in the first case, that is to say the lower condenser, is automatically replaced by the condenser 10 which now occupies the lowest position.

It is clear that to obtain the full efficacy of the light supply, it is necessary for the latter to be centered in each case on the optical axis of the condenser in use. For this reason, the base 6 of the lamp has two indexes 15 passing in the clamps 16 of the base 1 of the projector, and this makes it possible for the lamp to be displaced sideways. This operation could be effected by hand, but can also be effected automatically, as is the case in the example shown. For this purpose, a lever 17 turning round a screw 18 of the wall 2 and ending in two fork controls, by means of one of them and by means of a pin 19 the lateral movement of the base of the lamp, whereas by means of the other fork, the lamp is controlled by one of the two pins 20, 20' of the plate 8. This latter fork designated by the numeral 21 has two branches diverging in such a manner as to form a relatively open angle into which the pin 20 or the pin 20' enters when the plate 8 is inserted. By pushing this plate as far back as possible until it comes against a notch 22, the corresponding pin forces the lever 17 to swing and the light supply is centered automatically. This function is shown clearly in the two Figs. 1 and 3.

It is clear that the automatic centering of the light supply could be obtained by other means, just as the device described could be further completed with bolting means to prevent the condensers from being inserted for the projection in a given size, if the moving mechanism for the film or simply the film canal in which the latter passes, have not been modified in such a manner as to be adapted for the projection of said film.

It is also clear that a projector could be provided enabling the projection of more than two sizes of film and having, for this purpose, eventually a larger number of condensers, though the arrangement described can also be very well adapted for the projection of films of 16 mm., 9.5 mm. and 8 mm., the films of these two latter sizes being then projected with the condensers and the light supply in the same position, that is to say with the same condenser.

Having now fully described my invention, I claim:

1. In a cinematographic projector, a condenser lens mounting and assembly means for a projection lamp housing, comprising a lamp housing, an adjustable condenser lens mounting plate, a plurality of condenser lenses of different focal lengths mounted on said plate with their optical axes parallel to the projection axis, guide means on said housing to adjustably support said mounting plate to bring each condenser lens in successive optical alignment with said projection beam, means on said housing to secure said plate in adjusted position on said housing including a projection on the latter supporting the plate, and operative means on said housing for shifting the light source in said housing into optical alignment with said condenser lens plate to bring the desired condenser lens into operative alignment with the projection beam whereby picture areas of different sizes are illuminated by the whole of the projection beam.

2. In a cinematographic projector, a condenser lens mounting and assembly means for a projection lamp housing, comprising a lamp housing, an adjustable condenser lens mounting plate, a plurality of condenser lenses of different focal lengths mounted on said plate with their optical axes parallel to the projection axis, guide means on said housing to adjustably support said mounting plate to bring each condenser lens in successive optical alignment with said projection beam, means on said housing to secure said plate in adjusted position on said housing, and operative means on said housing for shifting the light source in said housing into optical alignment with said condenser lens plate to bring the desired condenser lens into operative alignment with the projection beam whereby picture areas of different sizes are illuminated by the whole of the projection beam, comprising a supporting base member for the light source mounted in the housing and movable in a plane parallel with the projection beam, means in said housing for securing said base member in various adjusted positions in said plane, and a shiftable control member movably secured in said housing and engaging said mounting plate at one end and at the other end engaging said base member so that each attained position assumed by the mounting plate will cause the shiftable control member to occupy a corresponding different adjusted position and thereby cause the base member to be disposed in a different adjusted position corresponding in predetermined degree of adjustment to the selected position of the mounting plate.

3. In a cinematographic projector, a condenser lens mounting and assembly means for a projection lamp housing, comprising a lamp housing, an adjustable condenser lens mounting plate, a plurality of condenser lenses of different focal lengths mounted on said plate with their optical axes parallel to the projection axis, guide means on said housing to adjustably support said mounting plate to bring each condenser lens in successive optical alignment with said projection beam, means on said housing to secure said plate in adjusted position on said housing, and operative means on said housing for shifting the light source in said housing into optical alignment with said condenser lens plate to bring the desired condenser lens into operative alignment with the projection beam whereby picture areas of different sizes are illuminated by the whole of the projection beam, comprising a supporting base member for the light source mounted in the housing and movable in a plane parallel with the projection beam, means in said housing for securing said base member in various adjusted positions in said plane, a pivotal mounting in said housing, engagement means on the mounting plate, a projection on the base member, and a control lever pivoted on said pivotal mounting and at one end engaging with said engagement means on said mounting plate and having an open angled fork on the other end straddling said projection on said base members so as to shift the base member by means of said fork in order that each attained position assumed by the mounting plate will cause the control lever to occupy a corresponding different adjusted position and thereby cause the base member to be disposed in a different adjusted position corresponding in predetermined degree of adjustment to the selected position of the mounting plate.

ERNEST ALFRED PAILLARD.